(12) United States Patent
Lim et al.

(10) Patent No.: US 9,173,306 B2
(45) Date of Patent: Oct. 27, 2015

(54) MOBILE DEVICE

(71) Applicant: LG ELECTRONICS INC., Seoul (KR)

(72) Inventors: Seunggeun Lim, Seoul (KR); Kyuho Lee, Seoul (KR); Dongguk Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 13/720,076

(22) Filed: Dec. 19, 2012

(65) Prior Publication Data

US 2013/0217443 A1  Aug. 22, 2013

(30) Foreign Application Priority Data

Feb. 21, 2012  (KR) .......................... 10-2012-0017554

(51) Int. Cl.
| | | |
|---|---|---|
| *H04B 1/38* | (2015.01) | |
| *H04M 1/00* | (2006.01) | |
| *G09G 5/00* | (2006.01) | |
| *H05K 5/00* | (2006.01) | |
| *H04M 1/02* | (2006.01) | |

(52) U.S. Cl.
CPC ........... *H05K 5/0017* (2013.01); *H04M 1/0216* (2013.01); *H04M 1/0235* (2013.01); *H04M 2250/16* (2013.01)

(58) Field of Classification Search
CPC ............ H04M 1/0214; H04M 1/0237; H04M 1/0245; H04M 1/021; H04M 1/0212; H04M 1/0216; H04M 1/0247
See application file for complete search history.

(56) References Cited

U.S. PATENT DOCUMENTS

| | | | |
|---|---|---|---|
| 8,599,105 B2 * | 12/2013 | Anttila et al. .................. 345/1.3 |
| 8,626,252 B2 * | 1/2014 | Kim et al. .................. 455/575.1 |
| 8,676,269 B2 * | 3/2014 | Song et al. ..................... 455/566 |
| 8,917,985 B2 * | 12/2014 | Kuwahara et al. ............ 396/287 |
| 2011/0063809 A1 | 3/2011 | Hoshino |
| 2013/0040711 A1 * | 2/2013 | Kim et al. .................. 455/575.1 |
| 2013/0102365 A1 * | 4/2013 | Oh et al. ........................ 455/566 |
| 2013/0308282 A1 * | 11/2013 | Shin et al. ..................... 361/749 |
| 2015/0009190 A1 * | 1/2015 | Kuwahara ..................... 345/205 |

FOREIGN PATENT DOCUMENTS

| | | | |
|---|---|---|---|
| CN | 101938538 A | 1/2011 | |
| EP | 1 111 919 A2 | 6/2001 | |
| EP | 2 254 313 A1 | 11/2010 | |
| EP | 2 254 314 A1 | 11/2010 | |
| EP | 2 273 769 A2 | 1/2011 | |

* cited by examiner

*Primary Examiner* — Bobbak Safaipour

(74) *Attorney, Agent, or Firm* — Birch, Stewart, Kolasch & Birch, LLP

(57) ABSTRACT

A mobile terminal includes first and second bodies rotatably coupled to each other, first and second display units formed on the first and second bodies, respectively, and a moving unit configured to allow the first and second bodies to rotate relative to each other between a folded configuration that one surfaces of the first and second bodies are overlaid by each other and an unfolded configuration that the first and second bodies are unfolded from each other, wherein the first and second display units are disposed on the other surfaces of the first and second bodies, respectively, to be externally exposed in the folded configuration, and wherein at least one of the first and second bodies relatively rotates with a rotation center thereof being moved by the moving unit such that the first and second display units form an obtuse angle with each other in the unfolded configuration.

18 Claims, 16 Drawing Sheets

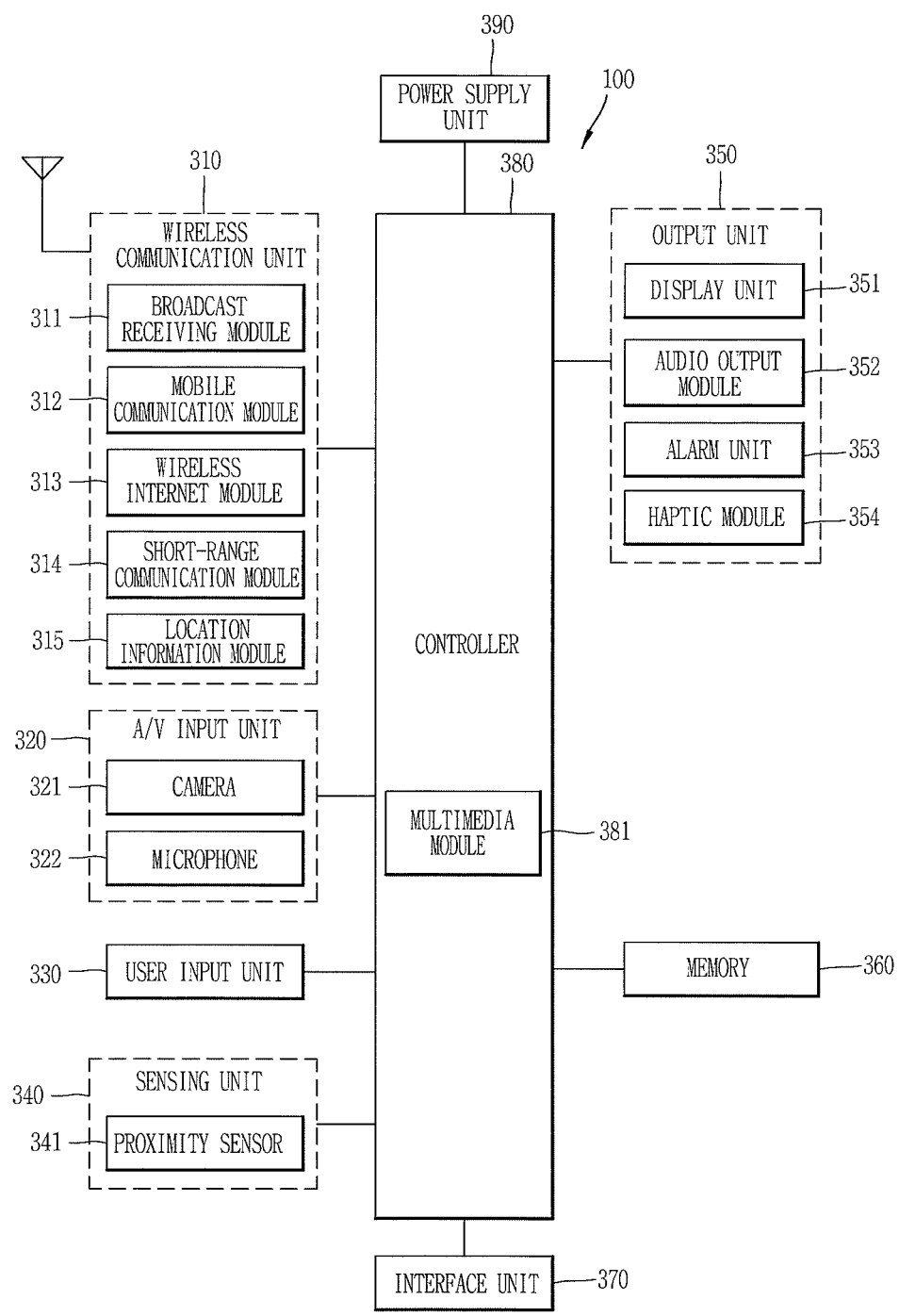

MOBILE DEVICE

CROSS-REFERENCE TO RELATED APPLICATIONS

Pursuant to 35 U.S.C. §119(a), this application claims the benefit of earlier filing date and right of priority to Korean Application No. 10-2012-0017554, filed on Feb. 21, 2012, the contents of which is incorporated by reference herein in its entirety.

BACKGROUND OF THE INVENTION

1. Field of the Invention

This specification relates to a mobile terminal having a dual display unit.

2. Description of Related Art

Mobile device (mobile terminal, portable device, portable terminal) can be easily carried and have one or more of functions such as supporting voice and video telephony calls, inputting and/or outputting information, storing data and the like.

As it becomes multifunctional, the mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions. For example, a user interface environment is provided in order for users to easily and conveniently retrieve or select functions.

In recent time, a mobile terminal is developed in a bar type whose front surface is mostly configured as a screen. The bar type mobile terminal has the advantages in the aspect of no need of an opening and closing operation and a simplified design, but also has a disadvantage in view of difficulty in configuring a large screen. When a dual display unit is provided on the mobile terminal to configure the large screen, such advantages of the bar type may not be guaranteed. To overcome this, a new form factor which ensures the advantages of the bar type and also allows for use of the dual display unit may be considered.

BRIEF SUMMARY OF THE INVENTION

Therefore, an aspect of the detailed description is to provide a mobile terminal having a new design or form factor.

Another aspect of the detailed description is to provide a mobile terminal capable of implementing a dual display whose position changes, with being always exposed to the outside, and providing a new function accordingly.

To achieve these and other advantages and in accordance with the purpose of this specification, as embodied and broadly described herein, there is provided a mobile terminal including first and second bodies rotatably coupled to each other, first and second display units formed on the first and second bodies, respectively, and a moving unit configured to allow the first and second bodies to rotate relative to each other between a folded configuration that one surfaces of the first and second bodies are overlaid by each other and an unfolded configuration that the first and second bodies are unfolded from each other, wherein the first and second display units may be disposed on the other surfaces of the first and second bodies, respectively, to be externally exposed in the folded configuration, and wherein at least one of the first and second bodies may relatively rotate with a rotation center thereof being moved by the moving unit such that the first and second display units form an obtuse angle with each other in the unfolded configuration.

In one aspect, the moving unit may include a rotation module connected to the first and second bodies, respectively, to generate the relative rotation between the first and second bodies, and a cam module configured to move the rotation center in cooperation with the rotation module upon the relative rotation.

The rotation module may include a base member mounted to one of the first and second bodies, a barrel member mounted to the other of the first and second bodies, and a connection member having a first connection portion connected to the base member, a second connection portion connected to the barrel member, and a perpendicular portion perpendicular to the first and second connection portions between the first and second connection portions. To the barrel member may be mounted a rotational shaft for providing the rotation center, and a spring hinge for applying an elastic force to the rotational shaft. Here, at least part of the rotational shaft may be inserted into the spring hinge. A guide member for insertion of the first connection portion therein may be connected to the base member, and a frame member for insertion of the second connection portion therein may be mounted onto the barrel member.

The cam module may include a cam profile portion formed at an outer surface of the barrel member, and a contact member coupled to the base member, at least part of the contact member contacting the cam profile portion between the folded and unfolded configurations. The frame member may be provided with a guide surface for guiding rotation of the barrel member within a section where the contact member does not contact the cam profile portion. The contact member may push the camp profile portion by contacting the cam profile portion so as to move the rotation center of the first body based on the second body.

The second body may include a receiving groove for receiving the barrel member therein in the folded configuration, and the barrel member may be mounted to one surface of the first body so as to be separated from the receiving groove and externally exposed in response to the relative rotation.

In another aspect, the moving unit may include an elastic module configured to apply an elastic force to end portions of the first and second bodies to be close to each other when the first and second bodies rotate from the unfolded configuration to the folded configuration.

The elastic module may include first and second shafts disposed by being spaced apart from each other, a link connected to the first and second shafts, respectively, and a torsion spring coupled to at least one of the first and second shafts to generate an elastic force in response to the rotation of the first and second bodies. A fixing portion may be mounted onto one of the first and second shafts, and the torsion spring may be coupled to the fixing portion and the other of the first and second shafts.

In another aspect, at least one of the first and second bodies may include a receiving groove to receive the moving unit in the folded configuration such that the moving unit is obscured by the first and second bodies in the folded configuration.

The rotation center of the first body may be received in the receiving groove in the folded configuration, and separated from the receiving groove in response to the relative rotation.

In another aspect, in the folded configuration, the first and second display units output information related to different operating modes from each other.

When a call-placing mode is executed in the folded configuration, the first display unit may be driven in cooperation with the call-placing mode, and the second display unit may be controlled by an application executing a different operating mode from the call-placing mode.

In another aspect, the first and second display units may be controlled to output the same information in the folded configuration according to settings.

In another aspect, the first and second display units may be formed to sense a touch input, and when the touch sensing of one of the first and second display units is activated, the touch sensing of the other may be deactivated.

In accordance with another exemplary embodiment of the detailed description, there is provided a mobile terminal including first and second bodies rotatably coupled to each other, first and second display units formed on the first and second bodies, respectively, a receiving groove formed at the second body, and a barrel member mounted to the first body to provide a rotational shaft for rotation of the first body, the barrel member being received in the receiving groove in a folded configuration that one surfaces of the first and second bodies are overlaid by each other. The first and second display units may be disposed on the other surfaces of the first and second bodies to face the outside in the folded configuration, and the barrel member may be separated from the receiving groove in response to the rotation of the first body, and externally exposed in an unfolded configuration that the first and second bodies are unfolded from each other so as to support the first body.

The barrel member may rotate with moving a rotation center when the first body rotates such that the first and second display units form an obtuse angle with each other in the unfolded configuration.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings:

FIG. 11 is a block diagram of a mobile terminal in accordance with the present disclosure.

DETAILED DESCRIPTION OF THE INVENTION

Hereinafter, a mobile terminal associated with the present disclosure will be described in more detail with reference to the accompanying drawings. A suffix "module" or "unit" used for constituent elements disclosed in the following description is merely intended for easy description of the specification, and the suffix itself does not give any special meaning or function. Hereinafter, suffixes "module" and "unit or portion" for components used herein in description are merely provided only for facilitation of preparing this specification, and thus they are not granted a specific meaning or function.

For the sake of brief description with reference to the drawings, the same or equivalent components will be provided with the same reference numbers, and description thereof will not be repeated. The expression in the singular form in this specification will cover the expression in the plural form unless otherwise indicated obviously from the context.

A mobile terminal disclosed herein may include a laptop computer, a tablet PC, a mobile phone, a smart phone, a digital broadcast terminal, a personal digital assistant (PDA), a portable multimedia player (PMP), a navigator, and the like.

Figure 1A:
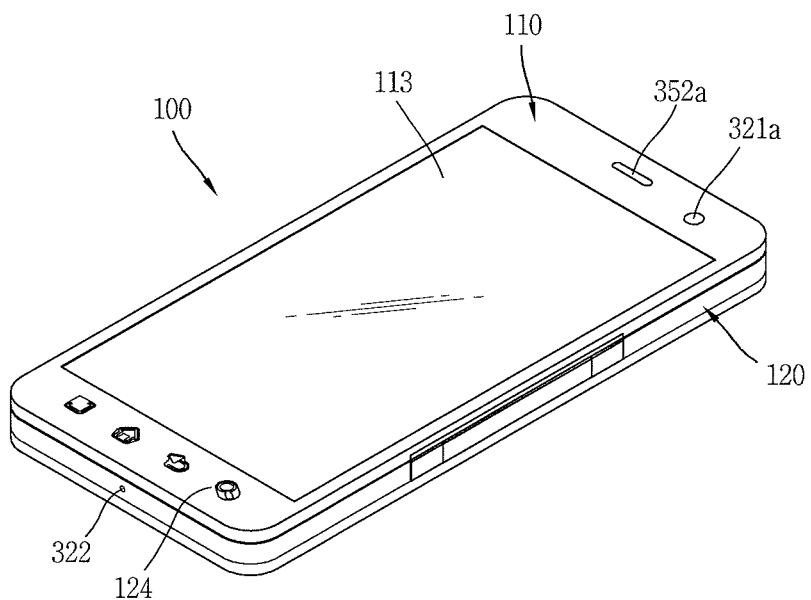
FIG. 1A is a perspective view showing a folded configuration of a mobile terminal in accordance with one exemplary embodiment.
Figure 1B:
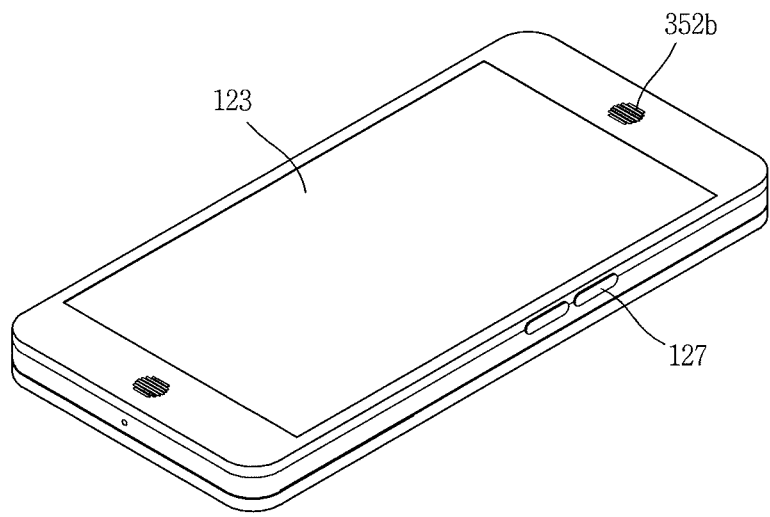
FIG. 1B is a perspective view showing an opposite surface of the mobile terminal to the surface shown in FIG. 1A.
Figure 2A:
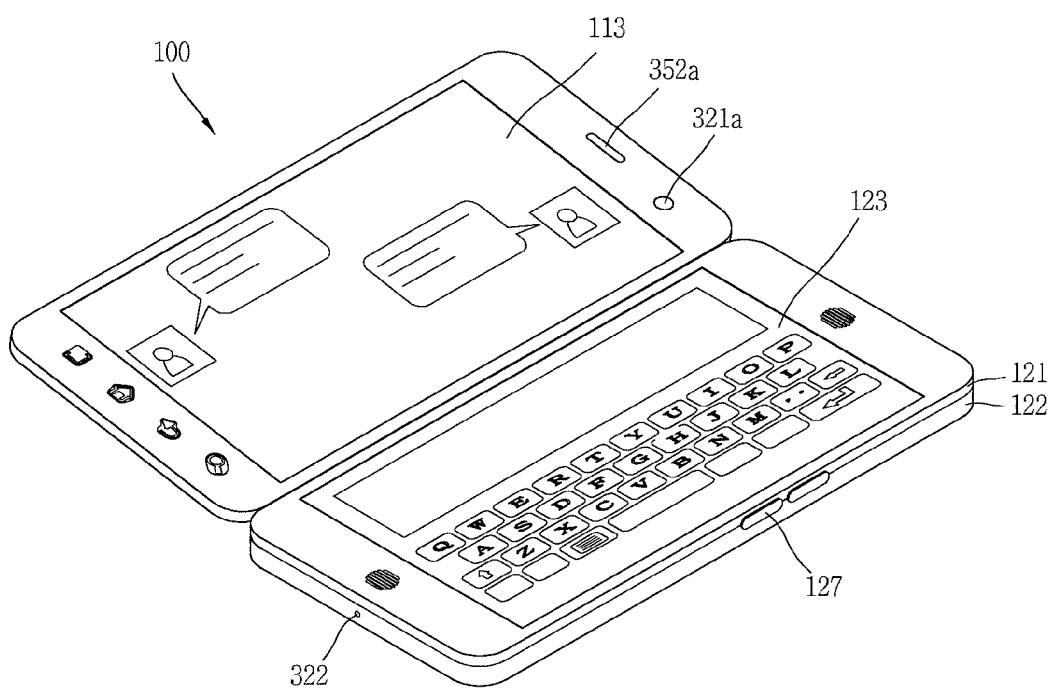
FIGS. 2A and 2B are perspective views showing an unfolded configuration of the mobile terminal shown in FIG. 1A.
Figure 2B:
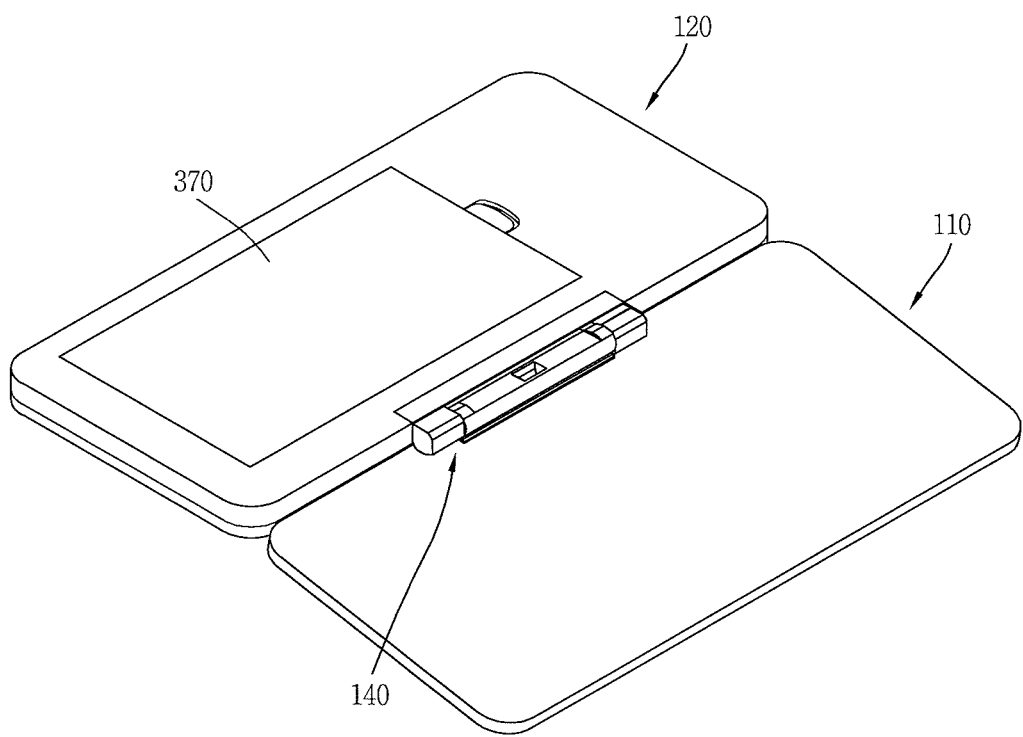

FIG. 1A is a perspective view showing a folded configuration of a mobile terminal in accordance with one exemplary embodiment, FIG. 1B is a perspective view showing an opposite surface of the mobile terminal to the surface shown in FIG. 1A, and FIGS. 2A and 2B are perspective views showing an unfolded configuration of the mobile terminal shown in FIG. 1.

As shown in FIGS. 1A to 2B, a mobile terminal 100 may include a first body 110 and a second body 120 having at least one side folded or unfolded with respect to the first body 110. The mobile terminal shown in FIGS. 1A to 2B exemplarily illustrates a folder type mobile terminal. However, the present invention may not be limited to the folder type but be applicable to various structures such as a flip type and the like.

Referring to FIG. 1A, when the first body 110 overlaps the second body 120, the state may be referred to as a folded or closed configuration. In the folded configuration, one surface of the first body 110 may be overlaid on one surface of the second body 120 in a facing manner.

Referring to FIG. 2A, the first and second bodies 110 and 120 are relatively rotated to be unfolded from each other. This state may be referred to as an unfolded or open configuration. In the unfolded configuration, the other surfaces (surfaces opposite to the one surfaces) of the first and second bodies 110 and 120 may form an obtuse angle. To this end, the first and second bodies 110 and 120 may rotate over 180° when the folded configuration is converted into the unfolded configuration.

In the folded configuration of the mobile terminal 100, various functions such as executing a call-placing mode may be executed. For this purpose, a first display unit 113 may be disposed on the other surface of the first body 110, and a second display unit 123 may be disposed on the other surface of the second body 120. Hereinafter, the other surfaces of the first and second bodies 110 and 120 having the first and second display units 113 and 123, respectively, may be referred to as a front surface, and the one surfaces opposite to those may be referred to as a rear surface.

Various configurations for functions or components to be disposed on the other surfaces of the first and second bodies 110 and 120 may be designed according to which function is urged in the mobile terminal 100 or which user interface is pursued in the mobile terminal 100. For example, the first display unit 113 may occupy most of the front surface of the first body 110. This may result in implementing a similar design to a bar type mobile terminal.

Also, the second display unit 123 may be configured to occupy most of the front surface of the second body 120. This may provide a design having the first and second bodies 110 and 120 as one body. Here, a form factor that display units are formed on both surfaces of the bar type mobile terminal may be implemented.

Hereinafter, the configurations of the first and second bodies will be described in more detail.

Referring to the drawings, a case defining an appearance of the first body 110 may be formed by a front case 111 and a rear case 112. A space formed between the front case and the rear case may accommodate various electronic components. At least one intermediate case may further be disposed between the front case and the rear case. The cases may be injected using a synthetic resin or be formed of a metal, such as stainless steel (STS), titanium (Ti) or the like.

Similar to the first body 110, a front case 121 and a rear case 122 may form the second body 120.

The first and second bodies 110 and 120 may include first and second display units 113 and 123, a first audio output module 352a, a camera 321a and a first manipulating unit 124.

In detail, the front case 111 of the first body 110 and the front case 121 of the second body 120 are shown having the first and second display units 113 and 123, the first audio output module 352a, the camera 321a and the first manipulating unit 124.

When the first and second bodies 110 and 120 rotate relative to each other, the first and second display units 113 and 123 may form a dual display on which one image information is displayed by being divided into a plurality of regions. For example, when a Graphic User Interface (GUI) of a specific mode is output on the first display unit 113 and a virtual keyboard is output on the second display unit 123, the dual display may implement a form factor similar to a laptop computer. Here, the present disclosure may not be limited to this, but information displayed on the first and second display units 113 and 123 may alternatively change into various forms. For example, information output on the first and second display units 113 and 123 may be combined to form one image. As an example of the combined image, if an image displayed is an airplane, a front part of the airplane may be output on the first display unit 113 and a rear part of the airplane may be output on the second display unit 123. The front and rear parts may then be combined with each other and accordingly the airplane may be output as one image.

For visually outputting information, each of the first and second display units 113 and 123 may include a display module, for example, a Liquid Crystal Display (LCD) module, an Organic Light Emitting Diodes (OLED) module, a Transparent OLED (TOLED) module and the like.

The first and second display units 113 and 123 may further include a touch sensor to allow a user to input information in a touching manner. To place a call, touch-sensitive numeral keys may be output on the display units 113 and 123.

The first and second display units 113 and 123 may generate various tactile effects that a user can feel upon touching. This may be implemented by a haptic module which is cooperative with the first and second display units 113 and 123. A representative of the tactile effects generated by the haptic module may be vibration. The haptic module may be disposed on various positions according to the configuration of the mobile terminal 100 as well as the first and second display units 113 and 123.

The first audio output module 352a may be implemented as a receiver or a speaker. The camera 321a may be implemented as a camera module for capturing image or video for a user or the like. The first manipulating unit 124 may receive a command for controlling an operation of the mobile terminal.

At one side of the second body 120 is shown having a broadcast signal receiving antenna (not shown) in addition to an antenna for communications. The antenna may be retractable into the second body 120.

Referring to FIG. 1B and FIG. 2A, the second body 120 may further include a second audio output module 352b and a second manipulating unit 127 in addition to the second display unit 123.

The second audio output module 352b may cooperate with the first audio output module 352a (see FIG. 1) to provide stereo output. Also, the second audio output module 352b may be configured to operate as a speakerphone.

The first manipulating unit 124 and the second manipulating unit 127 may all be referred to as a user input portion, and employ any tactile manner that a user can touch or tap for manipulation.

For example, the user input portion may be implemented as a dome switch, a touch screen or a touch pad for receiving user inputs of commands or information in a pushing or touching manner, or implemented as a wheel, a jog or a joystick for rotating a key.

From the functional perspective, the first manipulating unit 124 may be configured to input START, END, SCROLL, number, symbol and the like. The second manipulating unit 127 may operate as a hot key for performing a specific function, such as activating the camera 321a.

A microphone 322 may be disposed at one end of the second body 120.

The microphone 322 may be disposed on one side surface of the first body 110 or the second body 120 to allow for wireless phone call in the folded configuration.

The second body 120 may also include an interface unit (not shown) as a path for allowing data exchange between the mobile terminal 100 and an external device. For example, the interface unit may be at least one of a connection port for wired or wireless connection with an earphone, ports for short-range communication (for example, IrDA port, Bluetooth port, a wireless LAN port, etc.) or power supply ports for supplying power to the mobile terminal 100.

The interface unit may be a card socket for receiving external cards, such as a Subscriber Identification Module (SIM), User Identity Module (UIM), a memory card for storage of information.

Referring to FIG. 2B, the rear surface of the second body 120 is shown having a power supply unit 370 for supplying power to the mobile terminal 100. The power supply unit 370 may be, for example, a rechargeable battery, which is detachably coupled for charging.

As shown in the drawing, the first body 110 and the second body 120 may be rotatably coupled to each other by a moving unit 140. The moving unit 140 may allow the first and second bodies 110 and 120 to rotate relative to each other between the folded configuration and the unfolded configuration. The moving unit 140 may be thin enough to be disposed at side surfaces of the first and second bodies 110 and 120. This may allow the first and second bodies 110 and 120 to be folded or unfolded based on the side surfaces which are long in length. Referring to FIG. 2A, since a bezel is merely formed at a portion of the front surface of each of the first and second bodies 110 and 120, corresponding to the long side surface, the first and second display units 113 and 123 may be located adjacent to each other in the unfolded configuration.

Figure 3:
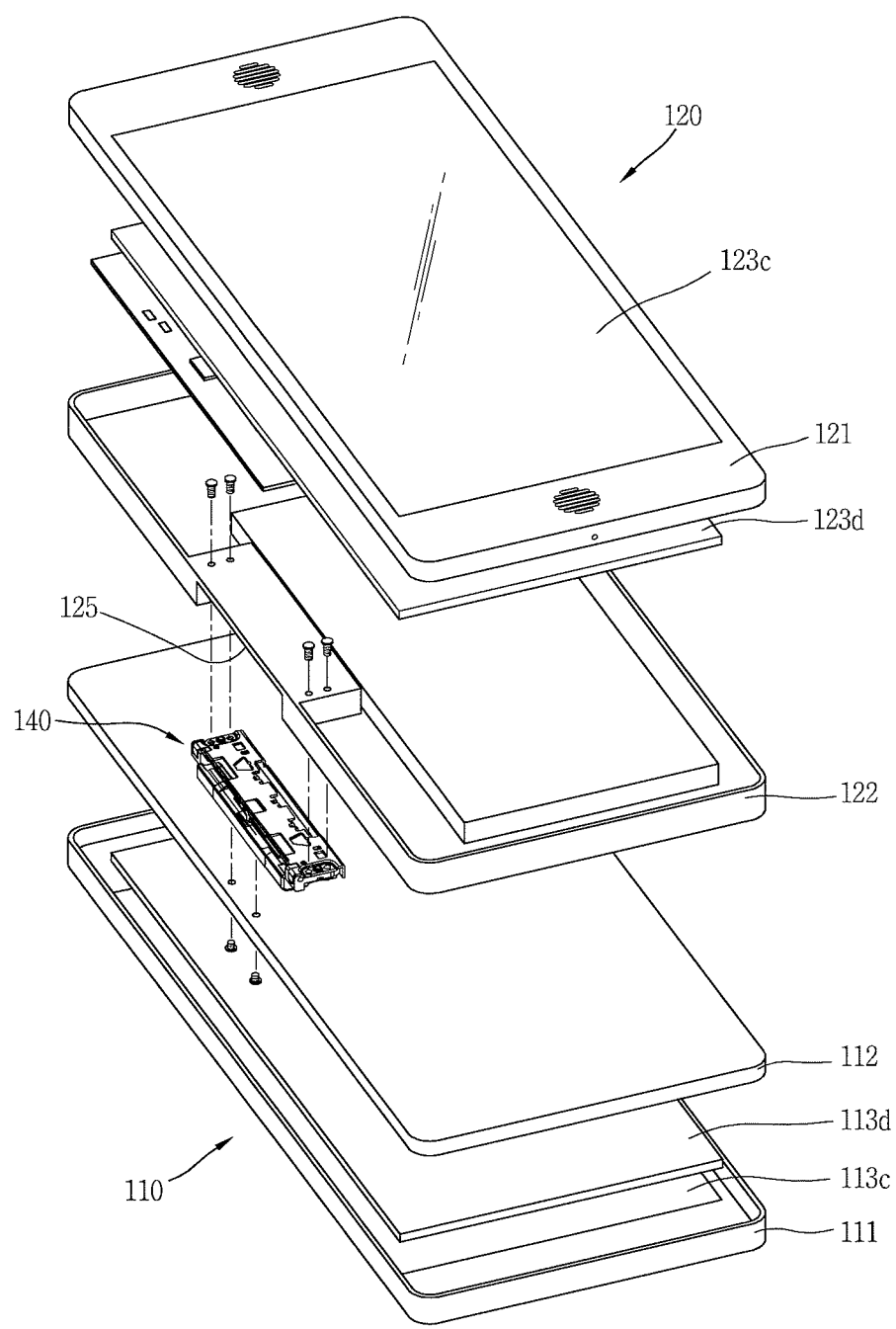
FIG. 3 is a disassembled perspective view of the mobile terminal of FIG. 1.
Figure 4:
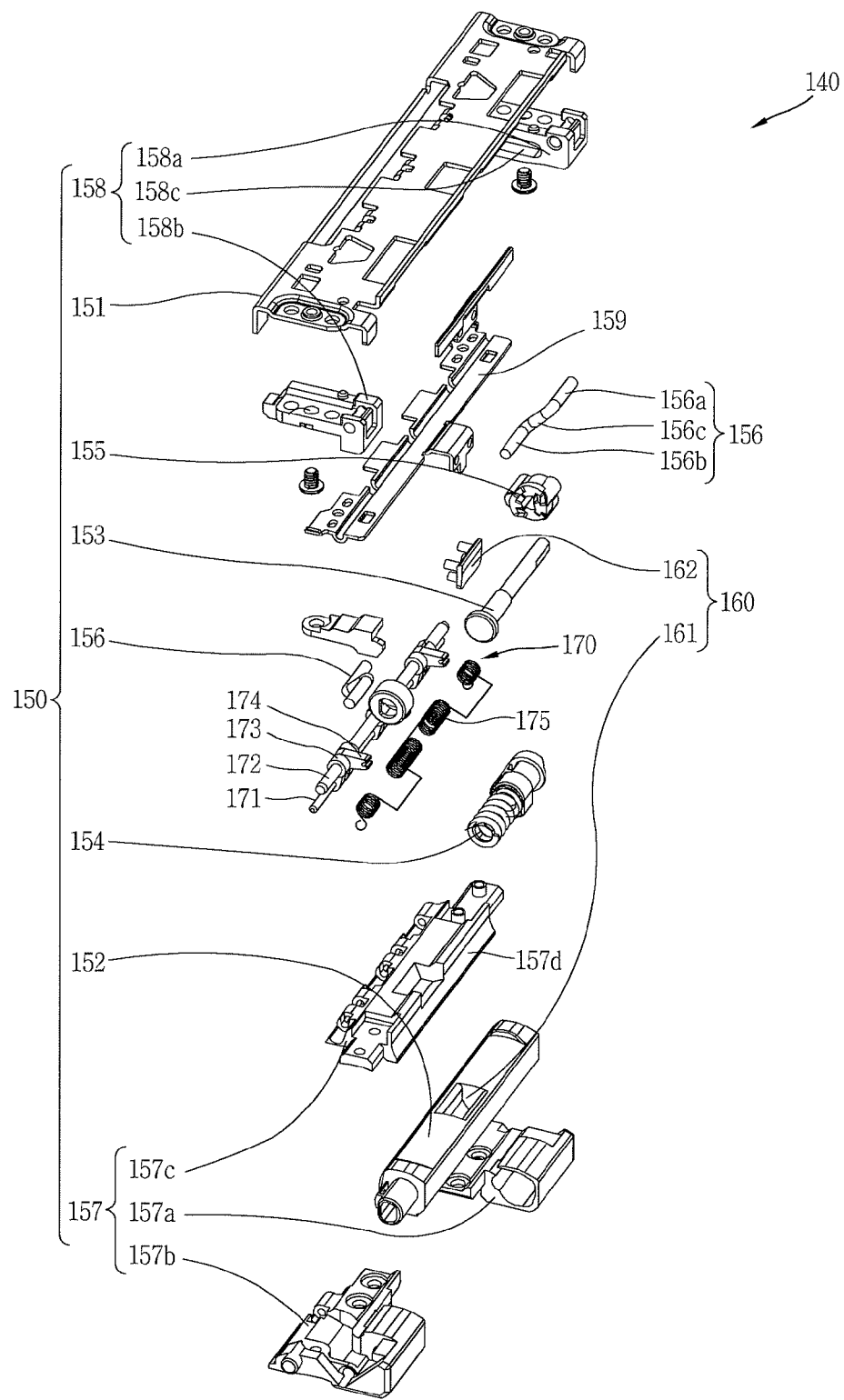
FIG. 4 is a disassembled view of a moving unit of FIG. 3.
Figure 5A:
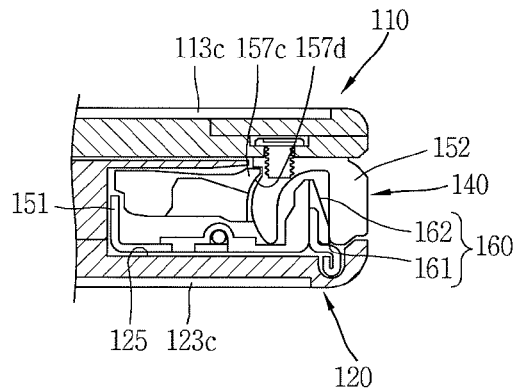
FIGS. 5A to 5F are sectional views showing an operation of the moving unit.
Figure 5B:
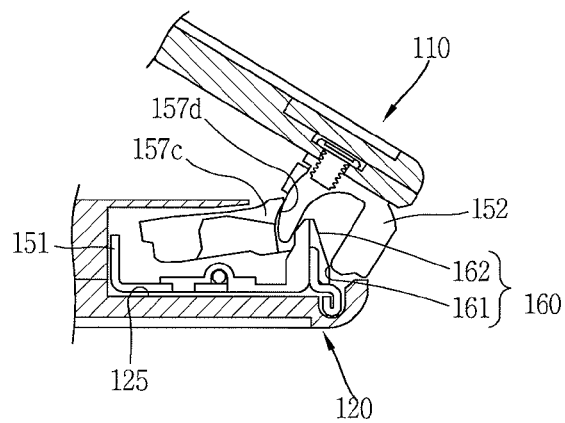
Figure 5C:
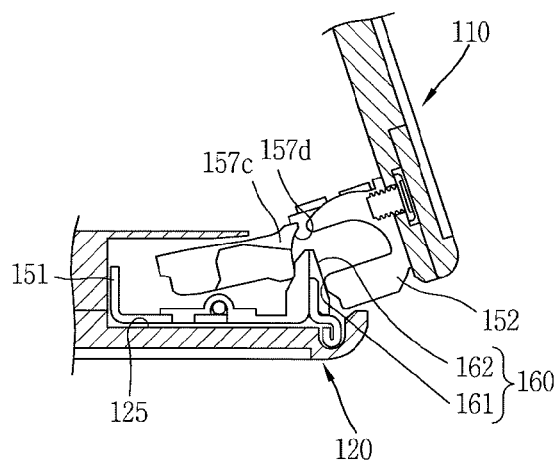
Figure 5D:
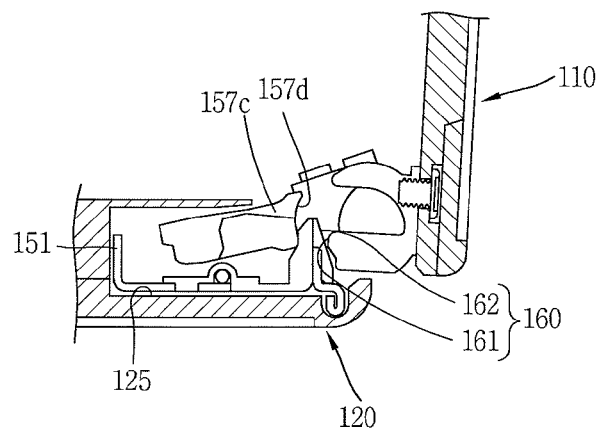
Figure 5E:
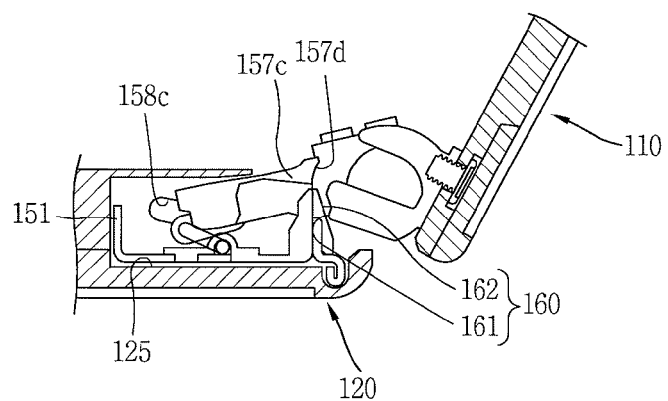
Figure 5F:
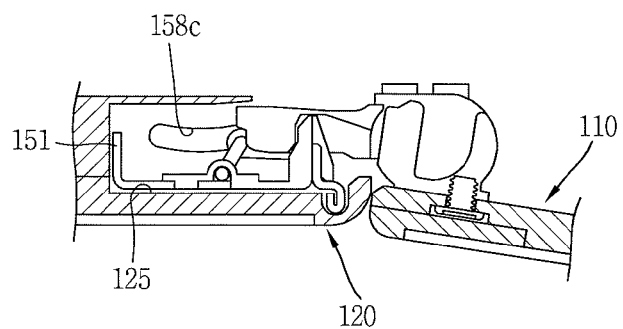

Hereinafter, detailed description will be given of configuration and operation of the moving unit associated with the first and second bodies. FIG. 3 is a disassembled perspective view of the mobile terminal of FIG. 1, FIG. 4 is a disassembled view of a moving unit of FIG. 3, FIGS. 5A to 5F are sectional views showing an operation of the moving unit, and FIGS. 6A to 6E are sectional views showing an operation of an elastic module.

As shown in those drawings, a receiving groove 125 may be formed at the rear surface of the second body 120, and the moving unit 140 may be received in the receiving groove 125 to be obscured by the first and second bodies 110 and 120 in the folded configuration.

In more detail, the receiving groove 125 may overlap a second window 123c which is located on the front surface of the second body 120. A window 113c of the first body 110 and the second window 123c may face different directions in the folded configuration of the mobile terminal 100.

The first and second windows 113c and 123c may be formed of a light-transmittable material, for example, a light transmittable synthetic resin, tempered glass and the like. Here, the first and second windows 113c and 123c may include an area through which light is not transmittable. This area may be formed of an opaque material or be a surface-processed area to prevent light transmission. The receiving groove 125 may be located to correspond to the light transmission-prevented area.

The first and second bodies 110 and 120 may include first and second display modules 113d and 123d, respectively, to correspond to the first and second windows 113c and 123c. The combinations of the first and second windows 113c and 123c and the first and second display modules 113d and 123d may define first and second display units 113 and 123, respectively.

The first and second windows 113c and 123c may extend to ends of the side surfaces of the first and second bodies 110 and 120, respectively, to be adjacent to each other in the unfolded configuration.

Referring to FIGS. 5A to 5F, at least part of the moving unit 140 may be separated from the receiving groove 125 in response to the rotation of the first body 110, and externally exposed in the unfolded configuration to support the first body 110. A rotation center of the first body 110 may be formed at the at least part of the moving unit 140 which is separated from the receiving groove 125. That is, the rotation center of the first body 110 is received in the receiving groove 125 in the folded configuration and separated from the receiving groove 125 with relatively rotating from the second body 120 by means of the moving unit 140.

According to the configuration and operation, the first and second display units 113 and 123 may be disposed to be externally exposed on the front surfaces of the first and second bodies 110 and 120 in the folded configuration and form an obtuse angle therebetween in the unfolded configuration. That is, as the rotation center is slid upon the relative rotation, the first body 110 may be rotatable over 180° (e.g., 180° to 200°) even though the moving unit 140 is located in the receiving groove 125.

Referring to FIGS. 3 and 4, the moving unit 140 may include a rotation module 150.

The rotation module 150 may be connected to the first and second bodies 110 and 120, respectively, so as to allow the relative rotation. In more detail, a base member 151 may be mounted onto one of the first and second bodies 110 and 120, and a barrel member 152 may be mounted onto the other of the first and second bodies 110 and 120. In the exemplary embodiment, the barrel member 152 is mounted onto the first body 110 and the base member 151 is mounted onto the second body 120, but the reverse configuration may also be applicable.

As shown, the base member 151 may be mounted onto a bottom of the receiving groove 125 of the second body 120, and define a base frame of the moving unit 140. The barrel member 152 may be mounted onto the rear surface of the first body 110 and relatively rotate with respect to the base member 151. That is, the barrel member 152, which has been received in the receiving groove 125 in the folded configuration, is separated from the receiving groove 125 in response to the rotation of the first body 110. The separated barrel member 152 is externally exposed in the unfolded configuration so as to support the first body 110. Also, one surface of the barrel member 152 may be externally exposed while the barrel member 152 is received in the receiving groove 125 so as to define the appearance of the mobile terminal at an end portion of the mobile terminal.

In the barrel member 152 may be inserted a rotational shaft 153 providing the rotation center, and a spring hinge 154 in which at least part of the rotational shaft 153 is inserted and which applies an elastic force to the rotational shaft 153. The spring hinge 154 may be combined with a cam 155 to implement a mechanism of applying the elastic force during folding and unfolding operations and releasing the elastic force in completely folded and unfolded states.

As shown, the barrel member 152 may convey the rotational shaft 153 in a thickness direction of the second body 120 upon the relative rotation with respect to the base member 151. To this end, a connection member 156 may be connected to the base member 151 and the barrel member 152, respectively.

The connection member 156 may be configured as a swing lever, and include a first connection portion 156a, a second connection portion 156b and a perpendicular portion 156c. More concretely, the first connection portion 156a may be connected to the base member 151, the second connection portion 156b may be connected to the barrel member 152, and the perpendicular portion 156c may be formed perpendicular to the first and second connection portions 156a and 156b therebetween. According to this structure, the barrel member 152 may be lifted in the thickness direction of the second body 120 upon rotation. In other words, the barrel member 152 may simultaneously perform a rotary motion and a swing motion based on the rotational shaft 153 with being restricted in the connection member 156.

In more detail, the connection member 156 may be mounted to the barrel member 152 and the base member 151 by use of a frame member 157 and a guide member 158. For example, the guide member 158 in which the first connection portion 156a is inserted may be connected to the base member 151, and the frame member 157 in which the second connection portion 156b is inserted may be mounted to the barrel member 152.

The frame member 157 may include first and second frames 157a and 157b disposed at both ends of the barrel member 152, and a central frame 157c overlapping the barrel member 152. The first and second frames 157a and 157b may be mounted to both end portions of the central frame 157c so as to function as a fixing shaft of the barrel member 152. To this end, the spring hinge 154 may be coupled to the frame member 157.

The guide member 158 may include first and second guide ways 158a and 158b, which are mounted to both end portions of the base member 151. The first and second guide ways 158a and 158b may be disposed such that side surfaces thereof can face side surfaces of the first and second frames 157a and 157b, respectively. Accordingly, the first and second guide ways 158a and 158b may generate a sliding path of the frame member 157. For the purpose, the guide member 158 (more concretely, the first and second guide ways 158a and 158b) may include slots 158c, which guide movement of the frame member 157 (more concretely, the first and second frames 157a and 157b).

In order to implement the swing motion of the barrel member 152, the moving unit 140 may be provided with a cam module 160. The cam module 160 may be configured to move the rotation center of the barrel member 152 in cooperation with the rotation module 150 upon the relative rotation. That is, the cam module 160 may allow for movement of the rotation center of the first body 110 based on the second body 120.

For example, the cam module 160 may include a cam profile portion 161 and a contact member 162. As shown, the cam profile portion 161 may be formed at an outer surface of the barrel member 152, and the contact member 162 may be configured such that at least part thereof can contact the cam profile portion 161 between the folded and unfolded configurations. The contact member 162 may contact the cam profile portion 161 to push the cam profile portion 161 in response to the rotation of the first body 110. In more detail, the cam profile portion 161 presses the contact member 162 responsive to the rotation of the barrel member 152, thereby generating a force to slide the barrel member 152 with respect to the base member 151.

To fix the contact member 162, the contact member 162 may be coupled to the base member 151. Here, the contact member 162 may be coupled to the base member 151 by means of a stabilizer holder 159. The stabilizer holder 159 may be mounted onto the base member 151 to increase rigidity of the base member 151, and serve as a portion for fixing a stabilizer (not shown), which extends along a lengthwise direction of the moving unit 140 to restrict the moving unit 140 from being horizontally tilted.

As shown, the frame member 157, especially, the central frame 157c may be provided with a guide surface 157d which guides rotation of the barrel member 152 within a section where the contact member 162 does not contact the cam profile portion 161.

Referring to FIGS. 4 and 6A to 6E, the moving unit 140 may include an elastic module 170. The elastic module 170 may apply an elastic force to end portions of the first and second bodies 110 and 120 to be close to each other when the first and second bodies 110 and 120 rotate from the unfolded configuration to the folded configuration.

In more detail, the elastic module 170 may include first and second shafts 171 and 172 spaced apart from each other. The first shaft 171 may be mounted to the frame member 157, and the second shaft 172 may be disposed parallel to the first shaft 171.

As shown, the first and second shafts 171 and 172 are connected to each other by a link 173, and a fixing portion 174 may be mounted onto the second shaft 172. The fixing portion 174 may rotate together with the second shaft 172. Here, a torsion spring 175 may be formed to be wound on the second shaft 172 and fixed at the fixing portion 174 and the first shaft 171, respectively.

Figure 6A:
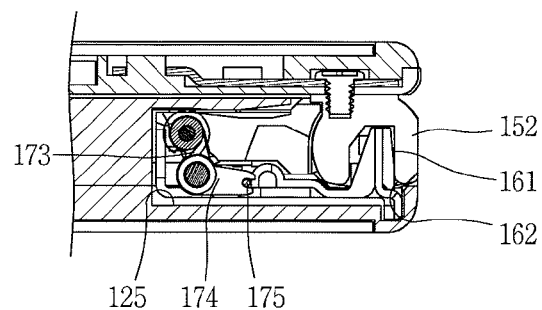
FIGS. 6A to 6E are sectional views showing an operation of an elastic module.
Figure 6B:
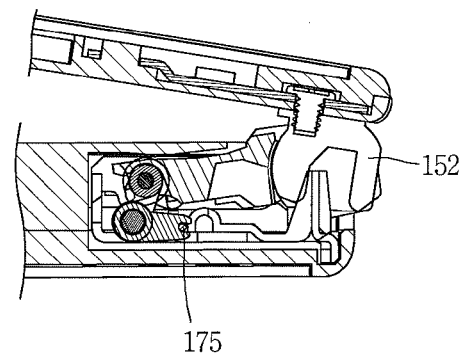
Figure 6C:
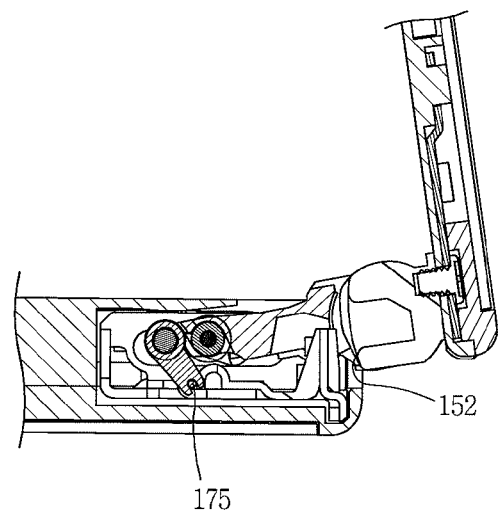

Referring to FIGS. 6A to 6C, when the barrel member 152 is rotated from the folded configuration, the cam profile portion 161 is pressed by the contact member 162, thereby changing an angle between the link 173 and the fixing portion 174. This may allow the torsion spring 175 to generate an elastic force.

Figure 6D:
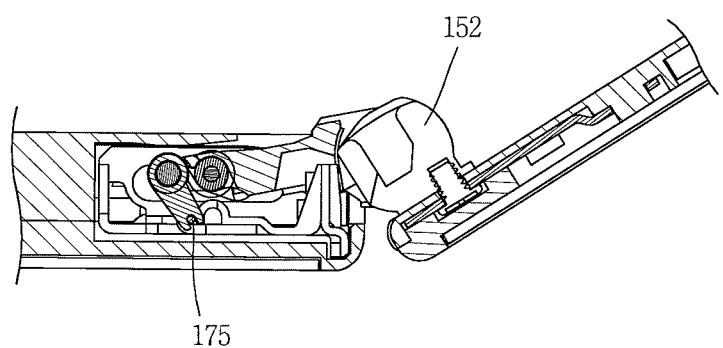
Figure 6E:
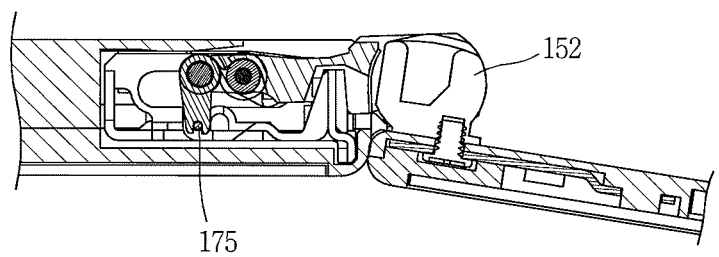

On the contrary, referring to FIGS. 6D and 6E, when the barrel member 152 is rotated in the unfolded configuration, the elastic force pulls the first shaft 171. Accordingly, the barrel member 152 which has been completely separated from the receiving groove 125 is pulled toward the receiving groove 125.

The configuration may implement a mechanism in which the rotation center of the first body 110, which has been slid by the cam module 160, is inserted into the second body 120 upon conversion from the folded configuration into the unfolded configuration.

Hereinafter, user interfaces applied to the mobile terminal having the configuration will be described.

Figure 7A:
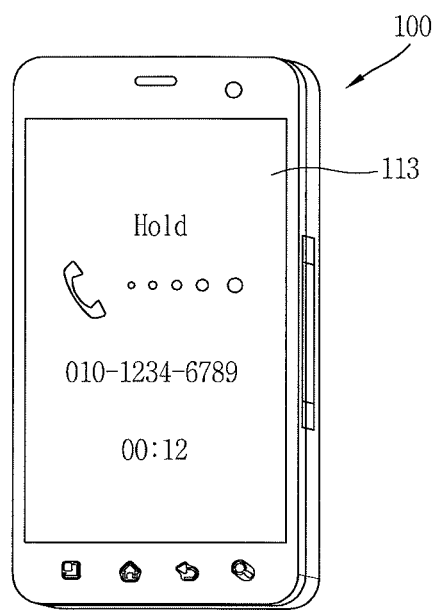
FIGS. 7A and 7B are overviews showing a user interface related to the mobile terminal.
Figure 7B:
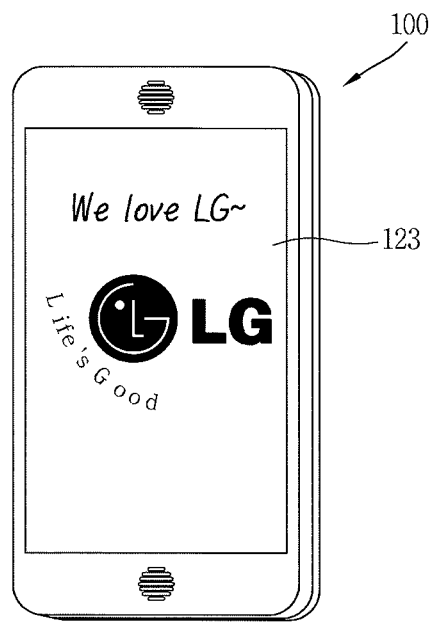

FIGS. 7A and 7B are overviews showing a user interface related to the mobile terminal.

Referring to FIGS. 7A and 7B, in the folded configuration, the first and second display units 113 and 123 output information related to different operating modes from each other.

For example, when a call-placing mode is executed in the folded configuration, the first display unit 113 is driven cooperative with the call-placing mode and the second display unit 123 is controlled by an application which executes a different operating mode from the call-placing mode.

As such example, when a user attempts to place a wireless call using the first display unit 113, the second display unit 123 outputs an advertisement (see FIG. 7B), and to this end, an application associated with the output of the advertisement may be automatically executed upon execution of the wireless call-placing mode.

The output of the information related to the different operating modes may change to various forms. For example, in order for a user to check information received by his mobile terminal while text or image is output on the second display unit 123, the received information may be output on the first display unit 113. Here, the present invention may not be limited to the structure. The roles of the first and second display units may alternatively change to each other.

Figure 8A:
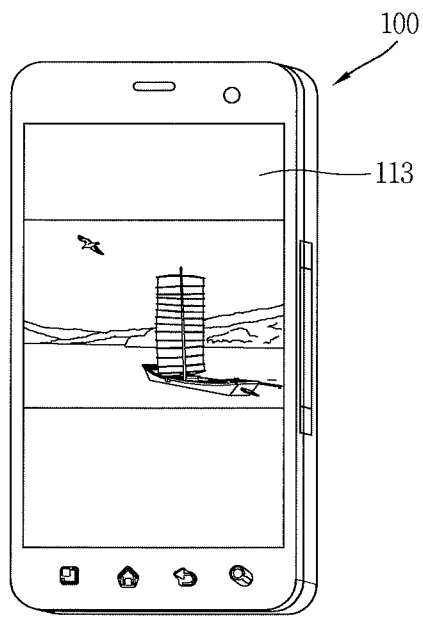
FIGS. 8A to 8C are overviews showing another user interface related to the mobile terminal.
Figure 8B:
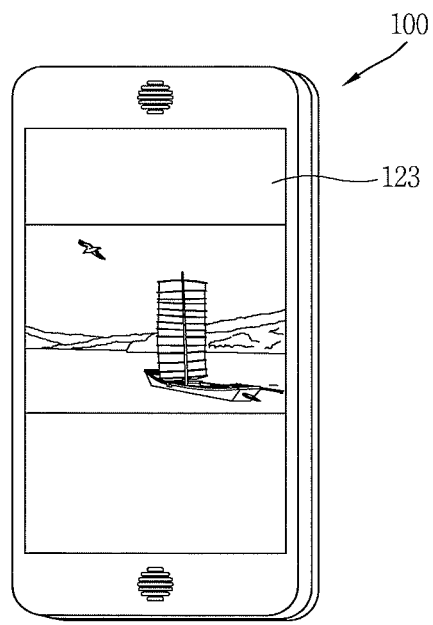
Figure 8C:
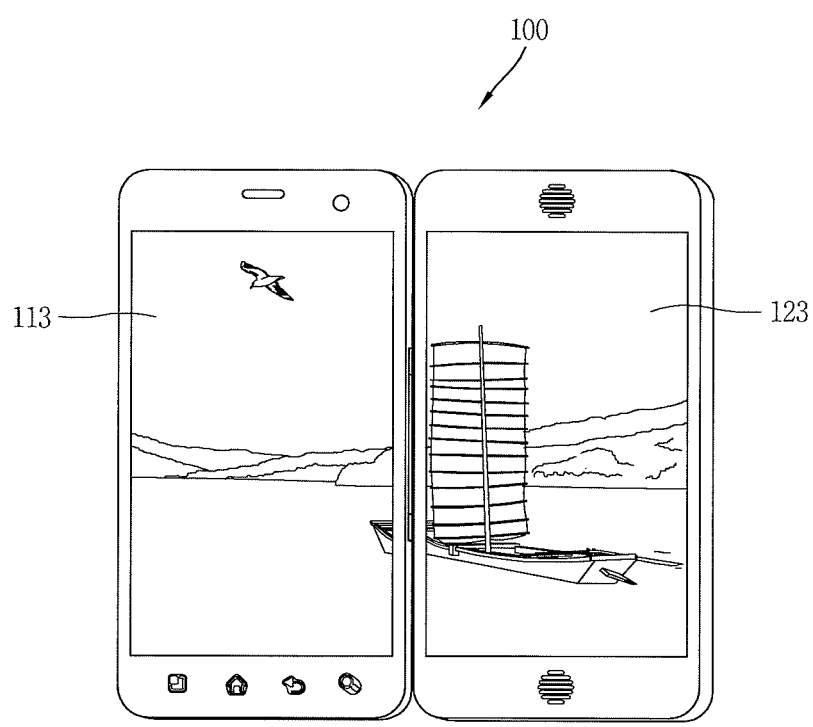

FIGS. 8A to 8C are overviews showing another user interface related to the mobile terminal.

Referring to FIGS. 8A to 8C, the first and second display units 113 and 123 may be controlled to output the same information in the folded configuration according to settings. As one example, the same video may be reproduced (see FIGS. 8A and 8B) or the same image may be output on the display units 113 and 123 of the mobile terminal. This may allow a plurality of users to recognize the same information at the same time.

In this case, the first and second display units 113 and 123 may be configured to detect a touch input, but alternatively, only one of the first and second display units 113 and 123 may be activated to detect the touch input. That is, when one of the first and second display units is activated to detect the touch input, the other one may be deactivated for the touch detection. This may allow only a main user to input a control command for the mobile terminal. Here, this control method may also be applied to a case where the first and second display units 113 and 123 output different information from each other.

Referring to FIG. 8C, when the mobile terminal is converted from the folded configuration into the unfolded configuration while the same information is output on the first and second display units 113 and 123, one information may be automatically output on the first and second display units 113 and 123. This operation may not be limited to this example. For example, when the mobile terminal is converted from the folded configuration into the unfolded configuration even while the first and second display units 113 and 123 output different information from each other, only one of the different information may be output on the first and second display units 113 and 123 in a dividing manner.

Figure 9A:
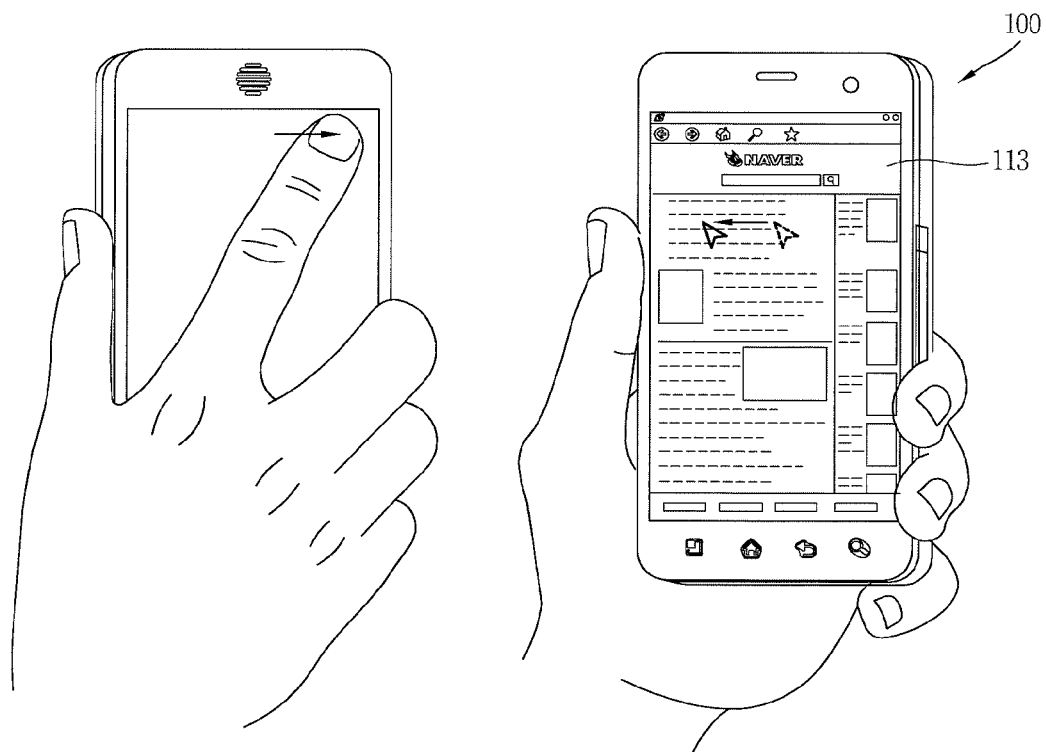
FIGS. 9A and 9B are overviews showing another user interface related to the mobile terminal.
Figure 9B:
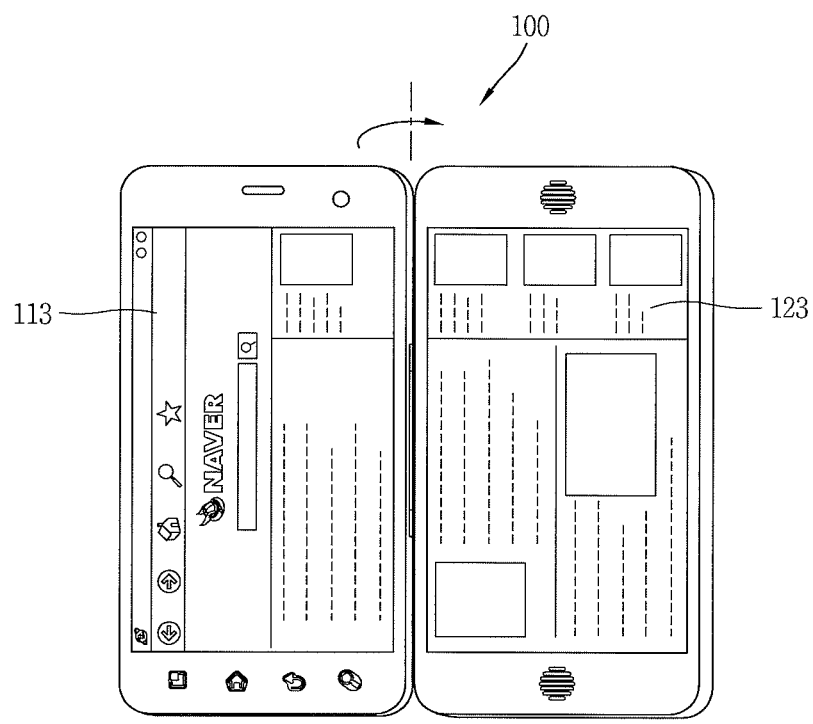

FIGS. 9A and 9B are overviews showing another user interface related to the mobile terminal.

Similar to the aforementioned exemplary embodiment, in this example, both the first and second display units 113 and 123 are configured to detect a touch input in the folded configuration. However, unlike the aforementioned exemplary embodiment, the touch detecting function may be activated in both the first and second display units 113 and 123. The outputting of the information on the first and second display units 113 and 123 may be executed only one of the first and second display units 113 and 123. Here, the controller may sense and process a touch with respect to the second display unit 123 as a touch input with respect to the first display unit 113. However, the present disclosure may not be limited to this case. For example, the present disclosure may be applied to a state that even the output function of both the first and second display units 113 and 123 is activated or a state that the touch detection of the first display unit 113 is deactivated.

As a more detailed example, referring to FIG. 9A, GUI (e.g., webpage) is output on the first display unit 113 in a deactivated state of the second display unit 123, and a user executes a touch input onto the webpage via the second display unit. As shown, a pointer or the like which informs a touch position with respect to the second display unit 123 may be output on the webpage. The pointer may be movable along a user's dragging input. Accordingly, a position of a finger which touches the second display unit 123 may be continuously informed to the first display unit 113. When the user stops dragging on a position where a cursor is located and then touches the second display unit, a function corresponding to the cursor-located position may be executed. The control method may allow a touch input without obscuring the front GUI with a hand.

In addition, output directions of GUI in the folded configuration and the unfolded configuration may be automatically converted. Referring to FIG. 9A, with GUI of the first display unit 113 (or the second display unit) output in a vertical direction (i.e., a portrait direction), when the terminal is converted into the unfolded configuration, the GUI may be converted into the horizontal direction (i.e., a landscape direction) as shown in FIG. 9B.

Figure 10A:
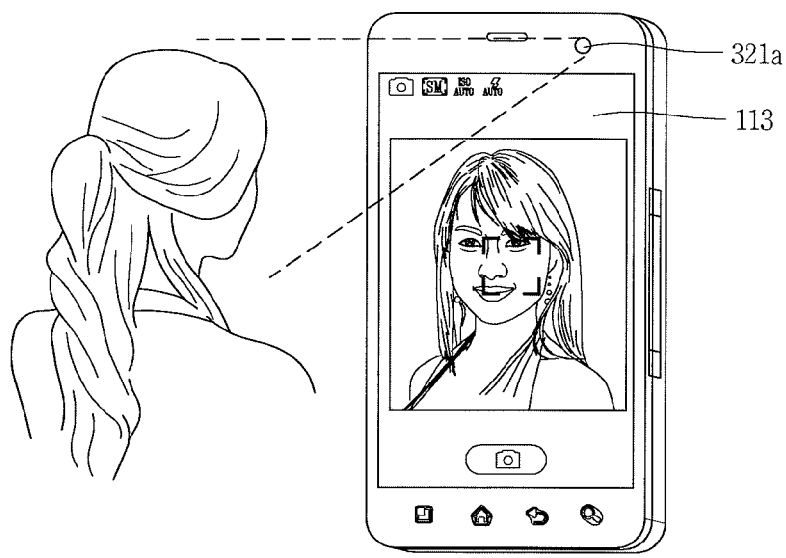
FIGS. 10A and 10B are overviews showing another user interface related to the mobile terminal.
Figure 10B:
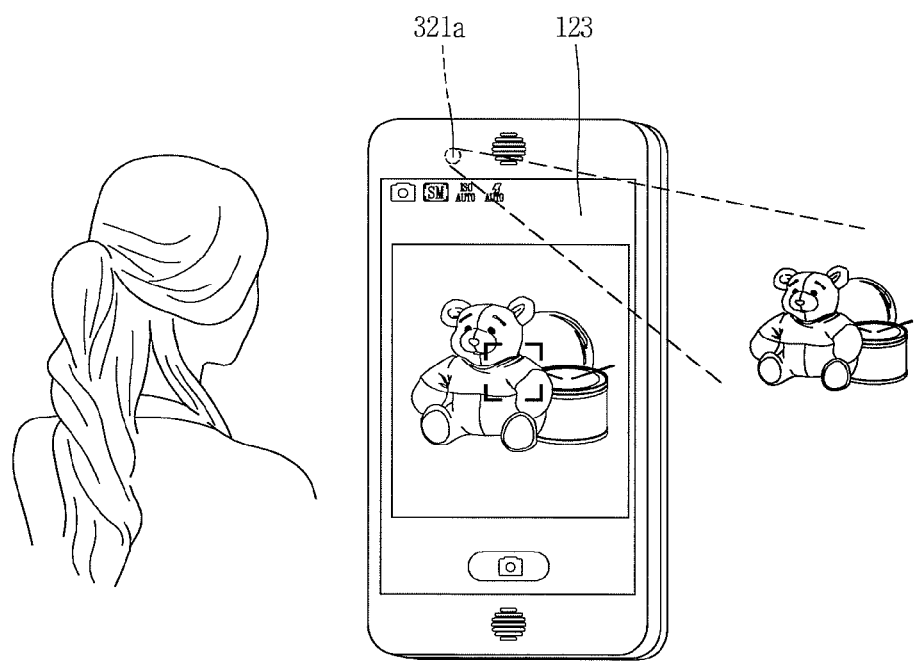

FIGS. 10A and 10B are overviews showing another user interface related to the mobile terminal.

Referring to the drawings, the camera 321a disposed at the front surface of the first body 110 may be used for capturing a user's face in a self-portrait mode or a telephony call mode or capturing a general object to be captured. In addition, for user convenience, a display unit to output an image captured by use of the camera 321a may be decided according to an operating mode of the mobile terminal.

Referring to FIG. 10A, the image captured by the camera 321a may be output on the first display unit 113 in the self-portrait mode or the telephony call mode. Referring to FIG. 10B, when an object located at an opposite side to the user with interposing the mobile terminal therebetween is captured, the image captured by the camera 321a may be output on the second display unit 123.

As such, the form factor according to the present disclosure may allow for implementation of user interfaces different from those in the related art.

FIG. 11 is a block diagram of a mobile terminal in accordance with the present disclosure. Description is given herein of the configuration of a mobile terminal 100 according to one exemplary embodiment, but it may be sufficiently inferred by a person skilled in the art that such description can be applied as it is to a mobile terminal according to another exemplary embodiment.

Referring to FIG. 11, the mobile terminal 100 may include a wireless communication unit 310, an Audio/Video (A/V) input unit 320, a user input unit 330, a sensing unit 340, an output unit 350, a memory 360, an interface unit 370, a controller 380, a power supply unit 390, and the like. However, all of the elements as illustrated in FIG. 11 are not necessarily required, and the mobile terminal may be implemented with greater or less number of elements than those illustrated elements.

Hereinafter, the constituent elements will be described in turn.

The wireless communication unit 310 typically includes one or more elements allowing radio communication between the mobile terminal 100 and a wireless communication system, or allowing radio communication between the mobile terminal 100 and a network in which the mobile terminal 100 is located. For example, the wireless communication unit 310 may include a broadcast receiving module 311, a mobile communication module 312, a wireless Internet module 313, a short-range communication module 314, a location information module 315, and the like.

The broadcast receiving module 311 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 312.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 311 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 311 is, of course, configured to be suitable for every broadcast system that provides a broadcast signal as well as the above-mentioned digital broadcast systems.

Broadcast signals and/or broadcast associated information received via the broadcast receiving module 311 may be stored in a suitable device, such as a memory 360.

The mobile communication module 312 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 313 is a module for supporting wireless Internet access. The wireless Internet module 313 may be built-in or externally installed to the mobile terminal 100. In this exemplary embodiment, the wireless Internet module 313 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 314 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 315 is a module for checking or acquiring a location of the mobile terminal, such as a GPS module.

The A/V input unit 320 receives an audio or video signal, and the A/V input unit 320 may include a camera 321 and a microphone 322. The camera 321 processes an image frame, such as still picture or video, obtained by an image sensor in a video phone call or image capturing mode. The processed image frame may be displayed on the display units 113 and 123.

The image frames processed by the camera 321 may be stored in the memory 360 or transmitted to an external device through the wireless communication unit 310. Two or more cameras 321 may be provided according to the use environment of the mobile terminal.

The microphone 322 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 312 in the phone call mode. The microphone 322 may implement various types of noise canceling algorithms to cancel noise generated in a procedure of receiving the external audio signal.

The user input unit 330 may generate input data to control an operation of the terminal. The user input unit 330 may be configured by including a keypad, a dome switch, a touch pad (pressure/capacitance), a jog wheel, a jog switch, and the like. In the present disclosure, the user input unit 330 may be used as a device for receiving a grouping command.

The sensing unit 340 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 370. On the other hand, the sensing unit 340 may include a gyro sensor 341 and an acceleration sensor 342.

The output unit 350 is configured to provide an output for audio signal, video signal, or alarm signal, and the output unit 350 may include the display units 113 and 123, an audio output module 352, an alarm unit 353, a haptic module 354, and the like.

The display unit 113, 123 may display (output) information processed in the mobile terminal 100. For example, when the mobile terminal 100 is in a phone call mode, the display unit 113, 123 may display a User Interface (UI) or a Graphic User Interface (GUI) associated with a call. When the mobile terminal 100 is in a video call mode or image capturing mode, the display unit 113, 123 may display a captured image and/or received image, a UI or GUI.

The display unit 113, 123 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such display units may be called transparent displays. An example of a typical transparent display may include a transparent LCD (TOLED), and the like. Under this configuration, a user can view an object positioned at a rear side of a terminal body through a region occupied by the display unit 113, 123 of the terminal body.

The display unit 113, 123 may be implemented in two or more in number according to a configured aspect of the mobile terminal 100. For instance, a plurality of the display units may be arranged on one surface to be spaced apart from or integrated with each other, or may be arranged on different surfaces.

In embodiments where the display unit 113, 123 and a touch sensitive sensor (referred to as a touch sensor) have an interlayer structure, the structure may be referred to as a touch screen. The display unit 113, 123 may be used as an input device in addition to being used as an output device. The touch sensor may be implemented as a touch film, a touch sheet, a touch pad, and the like.

The touch sensor may be configured to convert changes of a pressure applied to a specific part of the display unit 113, 123, or a capacitance occurring from a specific part of the display unit 113, 123, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 380. Accordingly, the controller 380 may sense which region of the display unit 113, 123 has been touched.

The audio output module 352 may output audio data received from the wireless communication unit 310 or stored in the memory 360 in a call-receiving mode, a call-placing mode, a recording mode, a voice recognition mode, a broadcast reception mode, and the like. The audio output module 352 may output audio signals relating to functions performed in the mobile terminal 100, e.g., sound alarming a call received or a message received, and so on. The audio output module 352 may include a receiver, a speaker, a buzzer, and so on.

The alarm unit 353 outputs signals notifying occurrence of events from the mobile terminal 100. The events occurring from the mobile terminal 100 may include a call received, a message received, a key signal input, a touch input, and the like. The alarm unit 353 may output not only video or audio signals, but also other types of signals such as signals notifying occurrence of events in a vibration manner. Since the video or audio signals can be output through the display unit 113, 123 or the audio output unit 352, the display unit 113, 123 and the audio output module 352 may be categorized into a part of the alarm unit 353.

The haptic module 354 generates various tactile effects which a user can feel. A representative example of the tactile effects generated by the haptic module 354 includes vibration. Vibration generated by the haptic module 354 may have a controllable intensity, a controllable pattern, and so on. For instance, different vibration may be output in a synthesized manner or in a sequential manner.

The haptic module 354 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The memory 360 may store a program for the processing and control of the controller 380. Alternatively, the memory 360 may temporarily store input/output data (e.g., phonebook data, messages, still images, video and the like). Also, the memory 160 may store data related to various patterns of vibrations and audio output upon the touch input on the touch screen.

The memory 360 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 360 on the Internet.

The interface unit 370 may generally be implemented to interface the mobile terminal 100 with external devices. The interface unit 370 may allow a data reception from an external device, a power delivery to each component in the mobile terminal 100, or a data transmission from the mobile terminal 100 to an external device. The interface unit 370 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 370 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 380 typically controls the overall operations of the mobile terminal 100. For example, the controller 380 performs the control and processing associated with telephony calls, data communications, video calls, and the like. The controller 380 may include a multimedia module 381 which provides multimedia playback. The multimedia module 381 may be configured as part of the controller 380 or as a separate component.

The controller 380 can perform a pattern recognition processing so as to recognize writing or drawing input on the touch screen as text or image.

The power supply unit 390 provides power required by various components under the control of the controller 380. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 380.

For software implementation, the embodiments such as procedures and functions may be implemented together with separate software modules each of which performs at least one of functions and operations. The software codes can be implemented with a software application written in any suitable programming language. Also, the software codes may be stored in the memory 360 and executed by the controller 380.

The mobile terminal according to at least one exemplary embodiment of the present disclosure having the configuration may allow for relative rotation of first and second bodies with moving a rotation center thereof, whereby the first and second bodies can relatively rotate over 180° with maintaining a slim body.

Also, a dual display may be formed on outer surfaces of the first and second bodies in a folded configuration and a moving unit may be obscured, which may result in an implementation of a bar type mobile terminal having the dual display on both surfaces thereof.

The combination of the position of the display and the moving unit may implement a new form factor that the dual display disposed at both surfaces in the folded configuration may form an obtuse angle in an unfolded configuration. In addition, this may implement a design different from the related art, in which the moving unit is obscured both in the folded configuration and in the unfolded configuration when a user views the display unit.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a first body having a first surface opposite a second surface, the first body having a first display unit at the second surface thereof;
    a second body having a first surface opposite a second surface, the second body being rotatably coupled to the first body, the second body having a second display unit at the second surface thereof; and
    a moving unit connecting the first body to the second body, the moving unit being configured to allow the first and second bodies to rotate relative to each other between a folded configuration where the first surfaces of the first and second bodies overlap and an unfolded configuration where the first and second bodies are unfolded from each other,
    wherein the first and second display units are externally exposed in the folded configuration,
    wherein one of the first and second bodies includes a receiving groove to receive the moving unit in the folded configuration and the moving unit is obscured by the first and second bodies in the folded configuration,
    wherein a rotation axis of the other of the first and second bodies is received in the receiving groove in the folded configuration,
    wherein during the relative rotation from the folded configuration to the unfolded configuration, the rotation axis is moved to be separated from the receiving groove by the moving unit.

2. The terminal of claim 1, wherein the moving unit includes:
    a rotation module connected to the first and second bodies to generate the relative rotation between the first and second bodies; and
    a cam module configured to move the rotation axis in cooperation with the rotation module during the relative rotation.

3. The terminal of claim 2, wherein the rotation module includes:
    a base member mounted to one of the first and second bodies;
    a barrel member mounted to the other of the first and second bodies; and
    a connection member having a first connection portion connected to the base member, a second connection portion connected to the barrel member, and a perpendicular portion perpendicular to the first and second connection portions between the first and second connection portions.

4. The terminal of claim 3, wherein the moving unit includes:
    a rotational shaft defining the rotation axis mounted to the barrel member; and
    a spring hinge configured to apply an elastic force to the rotational shaft mounted to the barrel member, at least part of the rotational shaft inserted into the spring hinge.

5. The terminal of claim 3, wherein the moving unit includes:
    a guide member connected to the base member and configured to receive the first connection portion therein; and
    a frame member mounted on the barrel member and configured to receive the second connection portion therein.

6. The terminal of claim 3, wherein the cam module includes:
    a cam profile portion formed at an outer surface of the barrel member; and
    a contact member coupled to the base member, at least part of the contact member contacting the cam profile portion during movement between the folded and unfolded configurations.

7. The terminal of claim 6, wherein the frame member includes a guide surface to guide rotation of the barrel member within a section where the contact member does not contact the cam profile portion.

8. The terminal of claim 7, wherein the contact member is configured to push the cam profile portion by contacting the cam profile portion so as to move the rotation axis.

9. The terminal of claim 4, wherein the second body includes the receiving groove for receiving the barrel member therein in the folded configuration, and the barrel member is mounted to one surface of the first body so as to be separated from the receiving groove and externally exposed in response to the relative rotation.

10. The terminal of claim 1, wherein the moving unit includes an elastic module configured to apply an elastic force to end portions of the first and second bodies to cause them to move close to each other when the first and second bodies rotate from the folded configuration to the unfolded configuration.

11. The terminal of claim 10, wherein the elastic module includes:
    a first shaft;
    a second shaft spaced apart from the first shaft;
    a link connecting the first and second shafts; and
    a torsion spring coupled to at least one of the first and second shafts to generate an elastic force in response to the rotation of the first and second bodies.

12. The terminal of claim 11, wherein the elastic module includes a fixing portion mounted on one of the first and second shafts and the torsion spring is coupled to the fixing portion and to the other of the first and second shafts.

13. The terminal of claim 1, wherein, in the folded configuration, the first and second display units are controllable to output information related to different operating modes.

14. The terminal of claim 13, wherein, when a call-placing mode is executed in the folded configuration, the first display unit is driven in cooperation with the call-placing mode and the second display unit is controlled by an application executing a different operating mode from the call-placing mode.

15. The terminal of claim 1, wherein the first and second display units are controllable to output the same information in the folded configuration.

16. The terminal of claim 1, wherein the first and second display units are formed to sense a touch input, and wherein, when the touch sensing of one of the first and second display units is activated, the touch sensing of the other is deactivated.

17. A mobile terminal comprising:

a first body having a first surface opposite a second surface, the first body having a first display unit at the second surface thereof;

a second body having a first surface opposite a second surface, the second body being rotatably coupled to the first body, the second body having a second display unit at the second surface thereof;

a receiving groove formed at the second body; and a barrel member mounted to the first body to provide a rotational shaft for rotation of the first body, the barrel member being received in the receiving groove in a folded configuration where first surfaces of the first and second bodies overlap, wherein the first and second display units face the outside in the folded configuration, and wherein the barrel member is separated from the receiving groove in response to the rotation of the first body and is externally exposed in an unfolded configuration where the first body is unfolded from the second body to support the first body, wherein a rotation axis of the first body is received in the receiving groove in the folded configuration, and wherein during the relative rotation from the folded configuration to the unfolded configuration, the rotation axis is moved to be separated from the receiving groove by the moving unit.

18. The terminal of claim 17, wherein the barrel member defines the rotation axis that moves when the first body rotates such that the first and second display units form an obtuse angle with each other in the unfolded configuration.

* * * * *